US 10,509,732 B2

(12) United States Patent
Moyer

(10) Patent No.: US 10,509,732 B2
(45) Date of Patent: Dec. 17, 2019

(54) SELECTING CACHE AGING POLICY FOR PREFETCHES BASED ON CACHE TEST REGIONS

(71) Applicant: Advanced Micro Devices, Inc., Sunnyvale, CA (US)

(72) Inventor: Paul Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 296 days.

(21) Appl. No.: 15/139,923

(22) Filed: Apr. 27, 2016

(65) Prior Publication Data

US 2017/0315932 A1 Nov. 2, 2017

(51) Int. Cl.
*G06F 12/00* (2006.01)
*G06F 12/123* (2016.01)
*G06F 12/0862* (2016.01)

(52) U.S. Cl.
CPC ........ *G06F 12/123* (2013.01); *G06F 12/0862* (2013.01); *G06F 2212/1021* (2013.01); *G06F 2212/602* (2013.01)

(58) Field of Classification Search
None
See application file for complete search history.

(56) References Cited

U.S. PATENT DOCUMENTS

| 6,532,520 B1 | 3/2003 | Dean et al. |
| 6,728,839 B1 | 4/2004 | Marshall |
| 2005/0289301 A1 | 12/2005 | Woo et al. |
| 2008/0059714 A1 | 3/2008 | Franaszek et al. |
| 2011/0072218 A1 | 3/2011 | Manne et al. |
| 2012/0151149 A1 | 6/2012 | Dubrovin et al. |
| 2012/0233261 A1 | 9/2012 | Ma et al. |
| 2012/0254550 A1 | 10/2012 | Gaur et al. |
| 2015/0286571 A1 | 10/2015 | Cain, III et al. |

OTHER PUBLICATIONS

Qureshi, M. et al. "Adaptive Insertion Policies for High Performance Caching." ISCA '07, Jun. 9-13, 2007. pp. 381-391. (Year: 2007).*
Examination Report dataed Aug. 2, 2017 for EP Application No. 17 152 933.2, 5 pages.
International Search Report and Written Opinion correlating to PCT/US16/051811 dated Jan. 9, 2017, 9 pages.
European Search Report dated Jul. 25, 2017 for EP Application No. 17152933.2, 4 pages.
Office Action dated Feb. 15, 2018 for European Application No. 17152933.2, 6 pages.

(Continued)

*Primary Examiner* — Daniel D Tsui

(57) ABSTRACT

A cache controller applies an aging policy to a portion of a cache based on access metrics for different test regions of the cache, whereby each test region implements a different aging policy. The aging policy for each region establishes an initial age value for each entry of the cache, and a particular aging policy can set the age for a given entry based on whether the entry was placed in the cache in response to a demand request from a processor core or in response to a prefetch request. The cache controller can use the age value of each entry as a criterion in its cache replacement policy.

22 Claims, 4 Drawing Sheets

(56) References Cited

OTHER PUBLICATIONS

Vivek Seshadri, et al., "Mitigating Prefetcher-Caused Pollution Using Informed Caching Policies for Prefetched Blocks," 2015, ACM Trans. Architec. Code Optim. 11, 4, Article 51 (Jan. 2015), 22 pages.
Examination Report dated Jul. 26, 2018 for European Application No. 17 152 933.2, 7 pages.
Office Action dated Jul. 26, 2018 in EP Application No. 17 152 933.2, 7 pages.
International Preliminary Report on Patentability dated Nov. 8, 2018 for corresponding International Application No. PCT/US2016/051811, 8 pages.
Summons to Attend Oral Proceedings dated Feb. 1, 2019 for corresponding European Application No. 17152933.2, 8 pages.

* cited by examiner

SELECTING CACHE AGING POLICY FOR PREFETCHES BASED ON CACHE TEST REGIONS

BACKGROUND

Field of the Disclosure

The present disclosure relates generally to processors and more particularly to processor caches.

Description of the Related Art

To improve memory access efficiency, many processors employ a memory hierarchy, whereby a processor includes one or more caches to store a subset of data stored in main memory. The criterion for which subset of data from the main memory is stored in the cache can vary depending on the processor design, but typically prioritizes the caching of data that has recently been accessed. In addition, some processors employ one or more prefetchers that predict data that is likely to be accessed by the processor core in the near future, and copies that data from main memory to the one or more caches. In order to move new data into the one or more caches, the processor must typically select previously stored data for eviction based on a specified replacement scheme. For example, some processors employ a least-recently-used (LRU) replacement scheme, whereby the processor evicts the cache entry that stores data that has not been accessed by the processor core for the greatest amount of time. However, in many scenarios the LRU replacement scheme does not correspond with the memory access patterns of instructions executing at the processor core, resulting in undesirably low memory access efficiency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
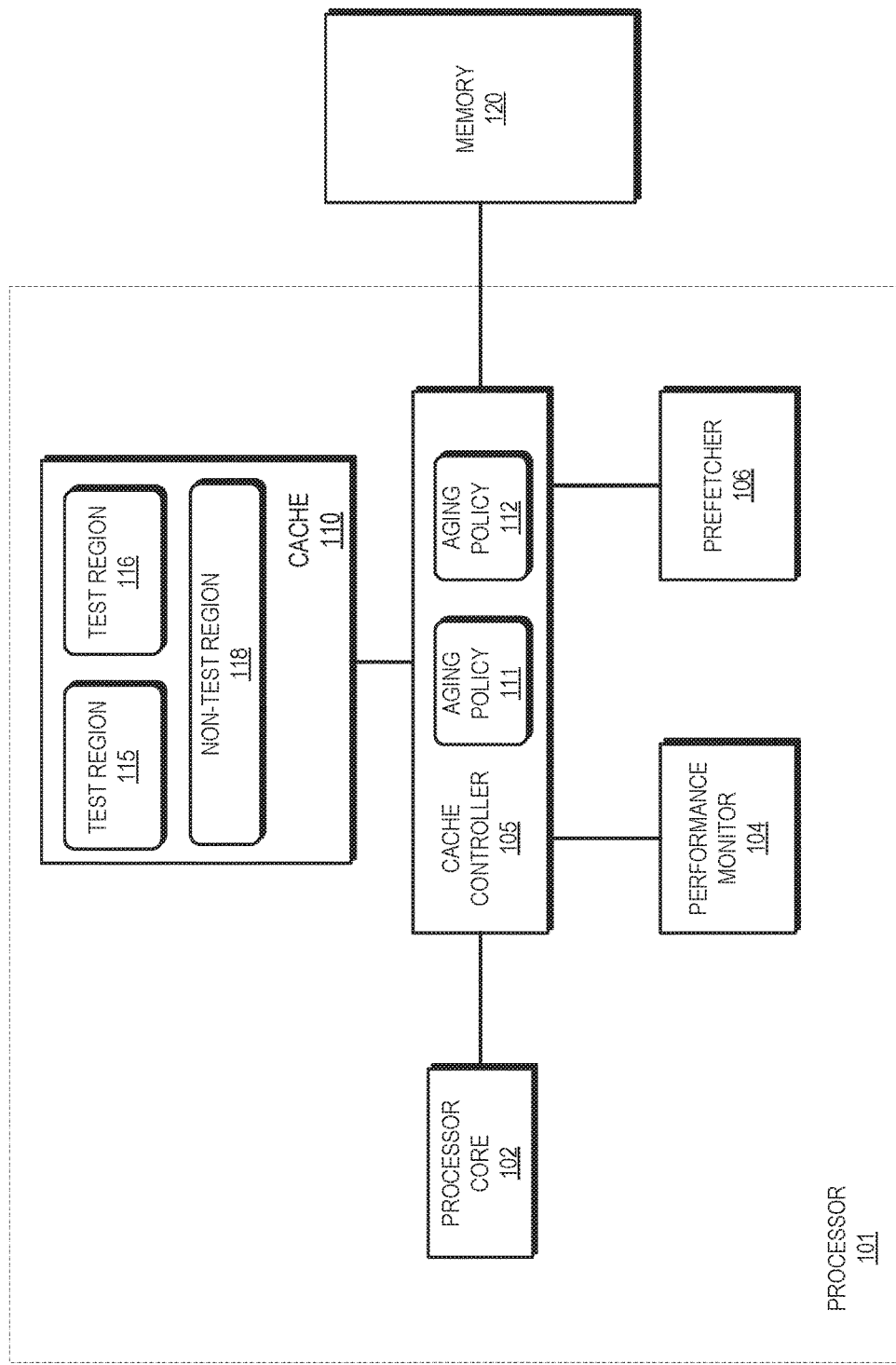
FIG. 1 is a block diagram of a processing system that applies an aging policy to a portion of a cache based on access metrics for different test regions of the cache in accordance with some embodiments.

FIGS. 1-4 illustrate techniques for applying an aging policy to a portion of a cache based on access metrics for different test regions of the cache, whereby each test region implements a different aging policy. The aging policy for each region establishes an initial age value for each entry of the cache, and a particular aging policy can set the age for a given entry based on whether the entry was placed in the cache in response to a demand request from a processor core or in response to a prefetch request. The cache can use the age value of each entry as a criterion in its cache replacement policy. By selecting a cache aging policy for the non-test portion of the cache based on access metrics for the different test regions, the cache can dynamically change the aging policy to the more efficient policy for instructions currently executing at the processor core.

To illustrate via an example, assume the cache has two test regions and a non-test region, whereby all the regions are employed by the cache to store data in response to demand requests from a processor core and prefetch requests from a prefetcher. The cache employs different aging policies for the different test regions, such that for one of the test regions the cache stores a specified initial age for entries associated with demand requests and a different specified initial age for entries associated with prefetch requests. For the other test region, the cache stores the same specified initial age for entries associated with demand requests and for entries associated with prefetch requests. Under both aging policies, the cache changes the age of each entry based on whether the entry is accessed by the processor core. In addition, for each test region the cache evicts entries based on least in part on the age of each entry. The processor monitors access metrics for each of the test regions, such as a cache hit rate, cache miss rate, or a combination thereof. Based on the metrics, the processor selects the aging policy for one of the test regions and applies it to the non-test region of the cache. For example, if the cache hit rate is higher for one of the test regions, the processor can apply the aging policy for that test region to the non-test region of the cache, thereby improving the hit rate for the cache overall. In addition, in response to changes in the relative cache hit rates for the different test regions change, the processor can change the aging policy applied to the non-test region apply different aging policies to the non-test region, thereby improving the cache hit rate for the cache overall.

As used herein, the term "aging policy" refers to how age values are applied to entries of a cache, as well as to how such age values may be modified once applied. The aging policy can govern an initial age applied to an entry when it is placed in the cache, the modification of the age in response to an entry being accessed or other entries being accessed, or a combination thereof. The age values can be employed the cache as part of its replacement policy for selecting entries to evict when new data is to be stored at the cache.

FIG. 1 illustrates a processing system 100 that applies a cache aging policy to a portion of a cache based on access metrics for different test regions of the cache in accordance with some embodiments. The processing system 100 is generally configured to execute sets of instructions organized in the form of computer programs in order to carry out tasks on behalf of an electronic device. Accordingly, the processing system 100 can be used in any of a variety of electronic devices, such as a desktop or laptop computer, server, smartphone, tablet, game console, and the like.

To facilitate execution of instructions, the processing system 100 includes a processor core 102, a cache controller 105, a cache 110, and a memory 120. In some embodiments, the processor core 102, cache controller 105, and cache 110 are formed on the same semiconductor die to form at least a portion of a processor core 102, and the memory 120 is formed on a different semiconductor die and connected to the processor 101 via one or more busses or signal lines. In some embodiments, at least a portion of the memory 120 is formed on the same semiconductor die as modules of the processor 101.

The cache 110 and the memory 120 are each memory devices generally configured to store data, and can therefore be random access memory (RAM) memory modules, non-volatile memory devices (e.g., flash memory), and the like. As described further herein, the cache 110 and the memory 120 form a memory hierarchy for the processing system 100. In addition, the memory hierarchy of the processing system 100 may include other memory modules, such as additional caches not illustrated at FIG. 1.

The processor core 102 includes an instruction pipeline having, for example, a fetch stage to fetch instructions, a decode stage to decode each fetched instruction into one or more operations, execution stages to execute the operations, and a retire stage to retire instructions whose operations have completed execution. One set of operations generated based on the instruction are referred to herein as memory access instructions, and are requests to load data (load operations) from the memory hierarchy of the processing system 100, and requests to store data at the memory hierarchy of the processing system 100. Memory access requests generated by the processor core 102 represent requests to load or store data that are being used or are known to be needed by an executing program, and are referred to herein as demand requests.

The cache controller 105 is a module generally configured to manage the memory hierarchy of the processing system 100 by moving data between the cache 110 and the memory 120. In particular, the cache 110 is a memory device including a plurality of entries, whereby each entry can be associated with one or more addresses of the memory 120. In response to a memory access request, the cache controller 105 reviews the data stored at one or more entries of the cache 110 to determine if any of the entries stores data associated with the memory address targeted by the memory access request. If so, the cache controller 105 indicates a cache hit and satisfies the memory access request at the identified entry, either by storing data at the entry (in the case of a store operation) or by providing the data at the identified entry to the processor core 102 (in the case of a load operation). If data associated with the memory address is not stored at an entry of the cache 110, the cache controller 105 indicates a cache miss and issues a request to the memory 120 for the data at the memory address. The cache controller 105 then stores the data at an entry of the cache 110, and satisfies the memory access request at the entry.

To support improved memory access efficiency, the processor 101 includes a prefetcher 106 that monitors demand requests issued to the cache controller 105 to identify patterns and predict, based on the identified patterns, memory addresses that will be the target of demand requests by the processor core 102 in the near future. The prefetcher 106 can issue to the cache controller memory access requests, referred to herein as prefetch requests, targeting the identified memory addresses. The cache controller 105 treats a prefetch request similar to a demand request by first identifying if data associated with the memory address targeted by the prefetch request is already stored at and entry of the cache 110 and, if not already stored, requesting the data from the memory 120 and storing the data at an entry of the cache 110.

In some embodiments, each entry of the cache 110 is associated with a subset of memory addresses and only data associated with that subset can be stored at the entry. For example, in some embodiments the cache is an N-way set associative cache having M sets and each of the M sets including N entries. Each of the M sets is assigned a different subset of memory addresses, such that the cache controller 105 only stores data at an entry if the data is associated with a memory address in the entry's assigned subset. When all entries of a set store data (referred to herein as "valid data") that may be the target of a memory access, the set is referred to herein as full. Further, when the cache controller 105 receives data that is to be stored at a full set, it selects one of the entries of the set to evict (that is, to remove from the set) and replace with the received data. The scheme that the cache controller 105 uses to select the entry for eviction is referred to as replacement policy for the cache 110.

The replacement policy for the cache 110 may be based at least in part on age values associated with each entry in a set. To illustrate, in response to storing data at an entry of the cache 110, the cache controller 105 stores an initial age value for the entry. In response to specified criteria the cache controller 105 can adjust the age value for an entry. For example, the cache controller 105 can decrease the age value for an entry in response to the entry being the target of a demand request from the processor core 102, and can increase the age value for the entry in response to another entry in the set, or in a different set, being the target of a demand request. The age value therefore reflects an indication of how recently an entry has been accessed relative to other entries of the set, or of the cache 110. When selecting an entry of a full set for eviction, the cache controller 105 can base the decision at least in part the age value of each entry in the set. For example, the cache controller 105 can select the entry having the highest age value for eviction. In some embodiments, the cache controller 105 can use the age value as part of weighted sum with other criteria, such as data priority information, data type information (e.g., whether the entry stores instruction data or operand data), or other information to select an entry for eviction.

As described above, the initial age value assigned to an entry by the cache controller 105, the criteria for adjusting the age value, and the amount by which the cache controller 105 adjusts the age value in response to each of the criteria is referred to as the aging policy for the entry. In some embodiments, the cache controller 105 can apply different aging policies to different regions of the cache 110, wherein each region includes a plurality of entries. In at least one embodiment, each region only varies as to its aging policy. Thus, the entries of a region may be used for any set, and different regions may include different entries of the same set.

In the depicted example of FIG. 1, the cache 110 includes three regions: test regions 115 and 116 and non-test region 118. In addition, the cache controller 105 stores aging policies 111 and 112 that differ in at least one aspect, such as the initial age value assigned to an entry, the amount by which an age value is adjusted in response to a specified criterion, and the like. In some embodiments, the aging policy 111 mandates a specified initial age for entries that store data responsive to a prefetch request and a different specified initial age for entries that store data responsive to non-prefetch requests. As used herein, a non-prefetch request refers to a memory access that is not a prefetch request targeted to the cache level to which the aging policy is applied. Examples of non-prefetch requests include demand requests, memory access requests generated in response to instruction cache misses, hardware page table walk requests, speculative memory access requests generated by the processor core 102 (e.g., memory access requests generated during speculative execution of instructions after a branch instruction), and prefetch requests generated at other cache levels.

In contrast, the aging policy 112 mandates the same initial age for entries that store data responsive to a prefetch request and entries that store data responsive to a non-prefetch request. The aging policy 111 can therefore be more efficient for memory access patterns that more frequently access prefetched data, and the aging policy 112 can be more efficient for memory access patterns that access prefetched data and non-prefetched data at about the same frequency. However, the memory access pattern for the processor core 102 can vary over time, such that the cache 110 may operate more efficiently under different aging policies at different times. Accordingly, for the non-test region 118, the cache controller 105 can select between the aging policies 111 and 112 depending on performance characteristics of the test regions 115 and 116.

To illustrate, the processor 101 includes a performance monitor 104 that can monitor and record performance characteristics, such as cache hit rate, cache miss rate, and the like, for each of the test regions 115 and 116. Based on one or more of the performance characteristics, or a combination thereof, of the test regions 115 and 116, the cache controller selects one of the aging policies 111 and 112 and applies it to the non-test region 118. For example, if the cache hit rate for the test region 115 is higher than the cache hit rate for the test region 116, the cache controller 105 can select the aging policy for the test region 115 (e.g., aging policy 111) and apply it to the non-test region 118. In some embodiments, the non-test region 118 includes the majority of the entries of the cache 110. Thus, by selecting the aging policy for the non-test region 118 as the more efficient aging policy, as indicated by the performance of the test regions 115 and 116, the cache controller 105 enhances the overall efficiency of the cache 110. Further, as the performance characteristics of the test regions 115 and 116 change over time, the cache controller can change the aging policy to the policy that is more efficient for a given set of performance characteristics.

Figure 2:
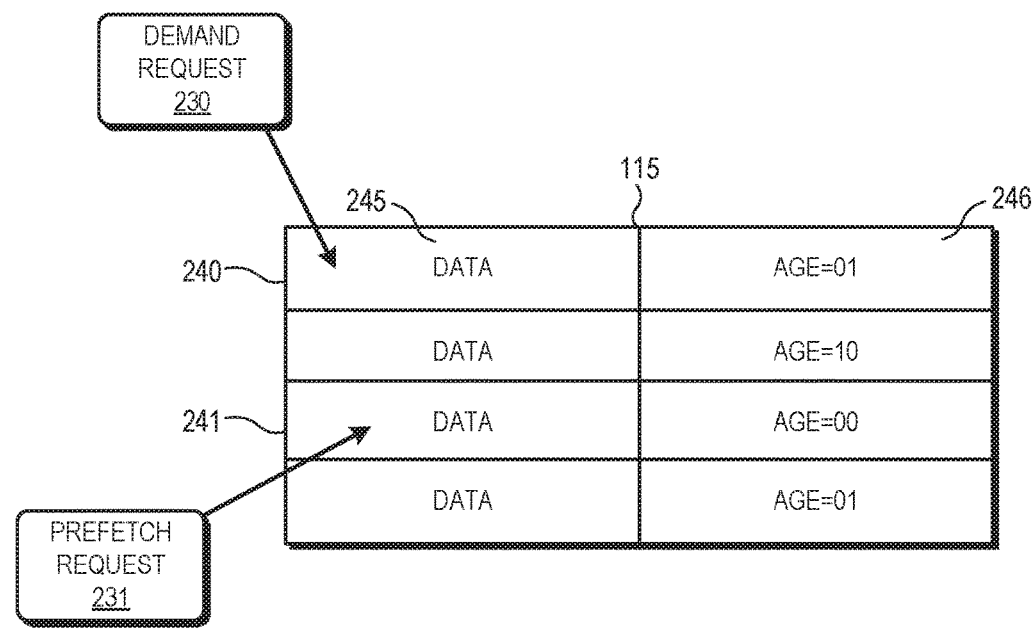
FIG. 2 is an example of the processing system of FIG. 1 employing different aging policies in different test regions of the cache in accordance with some embodiments.
Figure 2:
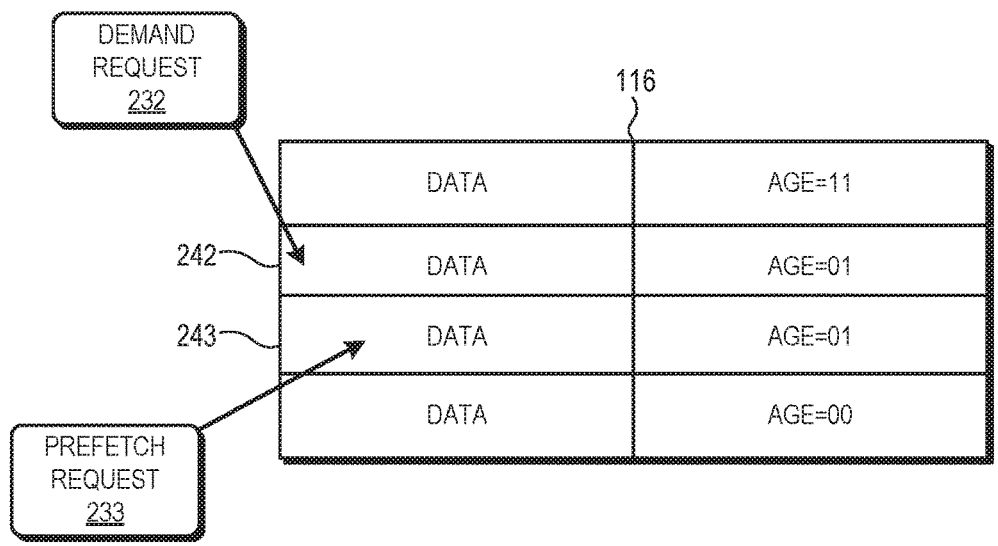

FIG. 2 illustrates an example of the cache controller 105 applying different aging policies to the test regions 115 and 116 of FIG. 1 in accordance with some embodiments. In the depicted example, each of the test regions 115 and 116 include a plurality of entries, such as entries 240 and 241 of test region 115 and entries 242 and 243 of test region 116. Each of the entries includes a data portion (e.g., data portion 245 of entry 240) to store data retrieved from the memory 120—that is, the data used to satisfy memory access requests at the entry. Each entry also includes an age field (e.g., age field 246 of entry 240) to store an age value for the entry.

For the example of FIG. 2, it is assumed the cache controller 105 applies an aging policy to the test region 115 wherein the initial age value stored at the age field for an entry depends on whether the data for the entry was retrieved from the memory 120 in response to a demand request or in response to a prefetch request. In particular, in response to retrieving data from the memory 120 in response to a prefetch request (e.g., prefetch request 231), the cache controller 105 stores an initial age value of "00" at the age field of the entry that stores the data. In contrast, in response to retrieving data from the memory 120 in response to a demand request (e.g., demand request 230), the cache controller 105 stores an initial age value of "01" at the age field of the entry. Thus, for the aging policy applied to the test region 115, the cache controller applies a "younger" initial age to entries storing prefetched data and an "older" initial age to entries storing demand data. This aging policy can be efficient for memory access patterns wherein the processor core 102 does not issue demand requests for prefetched data.

For the test region 116, the cache controller 105 applies an aging policy wherein the initial age value stored the same initial age at the age field of each entry, without regard to whether the entry is associated with a prefetch request or a demand request. Thus, in response to retrieving data from the memory 120 in response to a prefetch request (e.g., prefetch request 233), the cache controller 105 stores an initial age value of "01" at the age field of the entry that stores the data. Similarly, in response to retrieving data from the memory 120 in response to a demand request (e.g., demand request 232), the cache controller 105 stores an initial age value of "01" at the age field at the entry. Thus, for the aging policy applied to the test region 116, the cache controller applies the same initial age to all entries. This aging policy can be efficient for memory access patterns where the processor core 102 accesses prefetched data and demand data with substantially equal frequency. In other embodiments, the cache controller 105 can apply an aging policy that stores a lower initial age for demand requests and a higher initial age for prefetch requests.

As described above, the cache controller 105 applies different aging policies to the different test regions 115 and 116. By measuring the performance characteristics for each test region, the cache controller 105 can identify the more efficient aging policy for a recent memory access pattern of the processor core 102, and can apply the more efficient aging policy to the non-test region 118, thereby improving overall cache efficiency.

In some embodiments, in addition to or instead of applying different initial age values as described above, the different aging policies can require different adjustments to the age values. For example, for the test region 115, the cache controller 105 can apply an aging policy such that, in response to a memory access to an entry associated with a demand request, the cache controller 105 adjusts the age value for all entries storing prefetch data to the maximum age value of "11". Thus, in response to a memory access to entry 240, the cache controller 105 can adjust the age value for entry 240 to "00" and the age value for entry 241 (associated with prefetch request 231) to "11." In contrast, in response to a memory access the cache controller 105 adjusts the age values for entries associated with demand data by increasing the age value by one. Thus, in response to a memory access to the entry 241, the cache controller 105 increases the age value for the entry 240 (associated with demand request 230) by one, to the value "10." The aging policy applied to the test region 115 can be more efficient for memory access patterns where prefetch data is accessed relatively quickly after prefetch or is not accessed at all.

In contrast to the aging policy applied to the test region 115, the aging policy applied to the test region 116 can require the same adjustment of age values for each entry, without regard to whether the entry is associated with a demand request or a prefetch request. For example, in response to a memory access to an entry of the test region 116, the cache controller 105 can increase the age values for all other entries in the test region 116 by one, up to a maximum value. Thus, the different aging policies applied to the different test regions 115 and 116 can vary in one or more of several aspects, including the initial age value applied to an entry, the criteria for adjusting the age value of an entry, the amount by which the age value is adjusted in response to each criterion, and the like. Further, in some embodiments the cache 110 can include more than two test regions, with different aging policies applied to each test region, thereby giving the cache controller a wide range of possible aging policies to apply to the non-test region 118.

Figure 3:
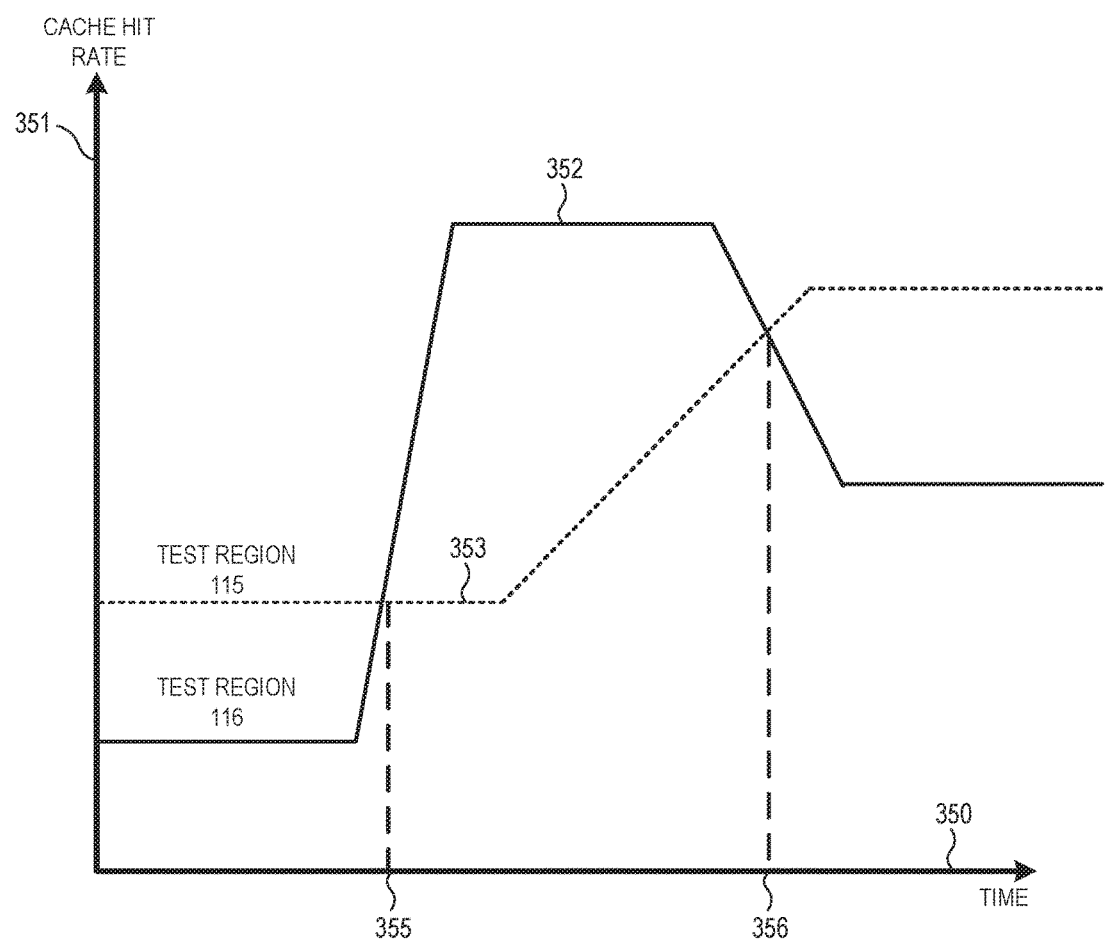
FIG. 3 is a diagram illustrating an example of the processing system of FIG. 1 changing the aging policy at the non-test region of the cache based on access metrics for test regions of the cache in accordance with some embodiments.

FIG. 3 illustrates a diagram 300 depicting an example of the relative performance of the different test regions 115 and 116 changing over time in accordance with some embodiments. The diagram 300 includes an X-axis 350 representing time and a Y-axis 351 representing cache hit rate. The diagram 300 depicts a curve 352 representing the cache hit rate for the test region 116 over time and a curve 353 representing the cache hit rate for the test region 115.

In the example illustrated by the diagram 300, prior to a time 355 the cache hit rate for the test region 115 is greater than the cache hit rate for the test region 116. Accordingly, prior to time 355 the cache controller 105 applies the aging policy for the test region 115 to the non-test region 118. At time 355, the relationship between the cache hit rates for the test regions 115 and 116 changes, such that the cache hit rate for the test region 116 is greater than the cache hit rate for the test region 115. In response, the cache controller 105 changes the aging policy for the non-test region 118 to match the aging policy for the test region 116. At a later time 356, the relationship between the cache hit rates for the test regions 115 and 116 again changes, such that the cache hit rate for the test region 115 is again greater than the cache hit rate for the test region 116. In response, the cache controller 105 changes the aging policy for the non-test region 118 to match the aging policy for the test region 115. Thus, the cache controller 105 changes the aging policy applied to the non-test region 118 based on changes in the relative performance of the test regions 115 and 116.

Figure 4:
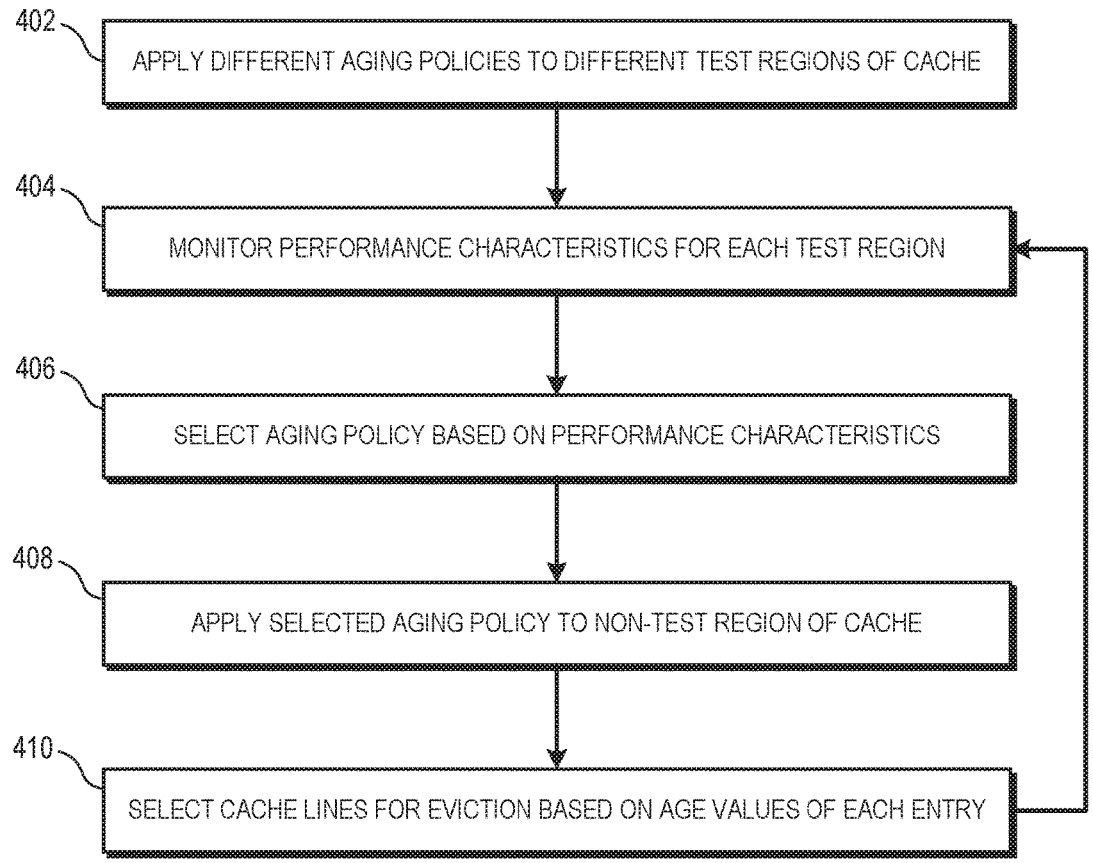
FIG. 4 is a flow diagram of a method of applying an aging policy to a portion of a cache based on access metrics for different test regions of the cache in accordance with some embodiments.

FIG. 4 is a flow diagram of a method 400 of selecting an aging policy for a non-test region of a cache based on performance characteristics of different test regions of the cache in accordance with some embodiments. For purposes of description, the method 400 is described with respect to an example implementation at the processing system 100 of FIG. 1. At block 402, the cache controller 105 applies the different aging policies 111 and 112 to the different test regions 115 and 116 of the cache 110. Thus, for example, the cache controller 105 can apply the aging policy 111 to the test region 115 and the aging policy 112 to the test region 116. At block 404, the performance monitor 104 monitors and records performance characteristics for the different test regions 115 and 116, such as cache hit rate, cache miss rate, a weighted sum of cache hit rate and cache miss rate, and the like.

At block 406, the cache controller 105 compares the performance characteristics for each of the test regions 115 and 116 and based on the comparison selects one of the aging polices 111 and 112. For example, the cache controller 105 selects the aging policy that is applied to the test region that has a higher performance as indicated by the performance characteristics. At block 408, the cache controller 105 applies the selected aging policy to the non-test region 118 of the cache 110. That is, the cache controller stores initial age values and adjusts stored age values at the non-test region 118 in keeping with the requirements of the selected aging policy. At block 410, the cache controller 105 uses the age values stored at the non-test region 118 to identify cache lines for eviction in accordance with a replacement policy for the cache 110. The method flow returns to block 404, reflecting that the cache controller 105 continues to monitor the performance of the test regions 115 and 116 and based on the performance adjusts the aging policy applied to the non-test region 118.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   at a first region of a cache, assigning different initial ages for cache entries that store data responsive to prefetch requests than for cache entries that store data responsive to demand requests and concurrently,
   at a second region of the cache, assigning the same initial age for cache entries that store data responsive to prefetch requests and for cache entries that store data responsive to demand requests; and
   replacing data at the first region of the cache and the second region of the cache based on ages of cache entries at the first region and the second region.

2. The method of claim 1, further comprising:
   measuring a first performance characteristic for the first region of the cache and a second performance characteristic for the second region of the cache;

selecting a first aging policy for a third region of the cache based on the first performance characteristic and the second performance characteristic; and replacing data at cache entries of the third region of the cache based on ages associated with the cache entries of the third region.

3. The method of claim 2, wherein selecting the first aging policy comprises:

selecting initial ages for cache entries at the third region based on whether data is stored at the cache entries in response to a prefetch request or a demand request.

4. The method of claim 2, wherein selecting the first aging policy comprises:

storing the same initial age for cache entries of the third region associated with demand requests and cache entries of the third region associated with prefetch requests.

5. The method of claim 2, wherein selecting the first aging policy comprises selecting the first aging policy at a first time, and the method further comprises:

selecting at a second time a second aging policy for the third region of the cache in response to a change in a relationship between the first performance characteristic and the second performance characteristic, the second aging policy being different from the first aging policy.

6. The method of claim 2, wherein:

the first performance characteristic comprises a cache hit rate at the first region of the cache; and the second performance characteristic comprises a cache hit rate at a second region of the cache.

7. The method of claim 2, wherein:

the first performance characteristic comprises a cache miss rate at the first region of the cache; and the second performance characteristic comprises a cache miss rate at a second region of the cache.

8. The method of claim 2, wherein:

the first performance characteristic comprises a first weighted sum of a cache hit rate at the first region of the cache and a cache miss rate at the first region of the cache; and the second performance characteristic comprises a second weighted sum of a cache hit rate at a second region of the cache and a cache miss rate at the second region of the cache.

9. The method of claim 1, wherein assigning different initial ages for cache entries that store data responsive to prefetch requests than for cache entries that store data responsive to demand requests comprises:

selecting a younger initial age for the cache entries that store data responsive to prefetch requests; and selecting an older initial age for cache entries that store data responsive to demand requests.

10. A method, comprising:

at a first region of a cache, applying a first aging policy to store initial ages for cache entries wherein the initial ages depend on whether the cache entries store data that was retrieved from memory in response to a demand request or a prefetch request and concurrently, at a second region of the cache, applying a second aging policy to store the same initial age for cache entries independent of whether the cache entries store data that was retrieved from memory in response to a demand request or a prefetch request;

selecting between the first aging policy and the second aging policy based on performance characteristics for the first region and the second region to determine a third aging policy; and replacing data at a third region of the cache based on the selected aging policy.

11. The method of claim 10, wherein selecting between the first aging policy and the second aging policy comprises:

selecting the first aging policy for the third region at a first time; and selecting the second aging policy for the third region at a second time.

12. The method of claim 11, wherein the second time is after the first time.

13. The method of claim 11, wherein the second aging policy for the third region is selected at the second time in response to a change in a relationship between the performance characteristics for the first region and the second region.

14. A processor, comprising:

a cache comprising a first region and a second region; and a cache controller configured to:

at the first region, select an initial age for cache entries based on whether data is stored at the cache entries in response to a prefetch request or a demand request and concurrently, at a second region of the cache, store the same initial age for cache entries independent of whether data is stored at the cache entries of the second region in response to a prefetch request or a demand request; and replace data at the first region of the cache and the second region of the cache based on ages of cache entries at the first region and the second region.

15. The processor of claim 14, further comprising:

a performance monitor to measure a first performance characteristic for the first region of the cache and a second performance characteristic for the second region of the cache; and wherein the cache controller is to:

select a first aging policy for a third region of the cache based on the first performance characteristic and the second performance characteristic; and replace data at cache lines of the third region of the cache based on the selected first aging policy.

16. The processor of claim 15, wherein the cache controller is to:

select an initial age for cache entries at the third region based on whether data is stored at the cache entries in response to a prefetch request or a demand request.

17. The processor of claim 15, wherein the cache controller is to select the first aging policy by:

storing the same initial age for cache lines of the third region associated with demand requests and cache lines of the third region associated with prefetch requests.

18. The processor of claim 15, wherein the cache controller is to:

select the first aging policy at a first time; and select at a second time a second aging policy for the third region of the cache in response to a change in a relationship between the first performance characteristic and the second performance characteristic, the second aging policy being different from the first aging policy.

19. The processor of claim 15, wherein:

the first performance characteristic comprises a cache hit rate at the first region of the cache; and the second performance characteristic comprises a cache hit rate at a second region of the cache.

20. The processor of claim 15, wherein:
the first performance characteristic comprises a cache miss rate at the first region of the cache; and
the second performance characteristic comprises a cache miss rate at a second region of the cache.

21. The processor of claim 15, wherein:
the first performance characteristic comprises a first weighted sum of a number of cache hits at the first region of the cache and a number of cache misses at the first region of the cache; and
the second performance characteristic comprises a second weighted sum of a number of cache hits at a second region of the cache and a number of cache misses at the second region of the cache.

22. The processor of claim 14, wherein the cache controller is to select an initial age for cache entries at the first region by:
selecting a younger initial age for cache entries in response to identifying that the data is stored at the cache entries in response to a prefetch request; and
selecting an older initial age for cache entries in response to identifying that the data is stored at the cache entries in response to a demand request.

\* \* \* \* \*